United States Patent
Tagami

(10) Patent No.: US 8,094,238 B2
(45) Date of Patent: Jan. 10, 2012

(54) VIDEO SIGNAL PROCESSING DEVICE AND VIDEO SIGNAL PROCESSING METHOD

(75) Inventor: Tomohisa Tagami, Osaka (JP)

(73) Assignee: Panasonic Corporation, Osaka (JP)

( * ) Notice: Subject to any disclaimer, the term of this patent is extended or adjusted under 35 U.S.C. 154(b) by 703 days.

(21) Appl. No.: 12/295,114

(22) PCT Filed: Apr. 10, 2007

(86) PCT No.: PCT/JP2007/057896
§ 371 (c)(1),
(2), (4) Date: Sep. 29, 2008

(87) PCT Pub. No.: WO2007/119718
PCT Pub. Date: Oct. 25, 2007

(65) Prior Publication Data
US 2009/0251596 A1 Oct. 8, 2009

(30) Foreign Application Priority Data

Apr. 11, 2006 (JP) ................................. 2006-108698

(51) Int. Cl.
*H04N 5/202* (2006.01)
(52) U.S. Cl. ....................................................... 348/674
(58) Field of Classification Search ........... 348/674–677
See application file for complete search history.

(56) References Cited

U.S. PATENT DOCUMENTS 4,786,968 A * 11/1988 Kutner .......................... 348/674
7,860,339 B2 * 12/2010 Yamashita et al. ............ 382/274

FOREIGN PATENT DOCUMENTS

| JP | 2001-184016 A | 7/2001 |
|---|---|---|
| JP | 2002-016805 A | 1/2002 |
| JP | 2003-348442 A | 12/2003 |
| JP | 2004-133033 A | 4/2004 |
| JP | 2004/140702 | 5/2004 |
| WO | 02/01850 | 1/2002 |

OTHER PUBLICATIONS

English language Abstract of JP 2001-184016 A.
English language Abstract of JP 2002-016805 A.
English language Abstract of JP 2003-348442 A.
English language Abstract of JP 2004-133033 A.
English language Abstract of JP 2004-140702.

* cited by examiner

*Primary Examiner* — Michael Lee
(74) *Attorney, Agent, or Firm* — Greenblum & Bernstein, P.L.C.

(57) ABSTRACT

A video signal processing device is a video signal processing device for converting an input first video signal to a second video signal, and inputting to a display panel, the video signal processing device including an input unit for receiving an input of a set value of the second video signal to be converted and output in correspondence to a signal level for each of a plurality of sample points of the signal level of the first video signal; a calculating unit for interpolation calculating the signal level of the second video signal to be converted and output for the signal level between each sample points; and a control unit for transferring a conversion table including a set value of the second video signal for each sample point of the first video signal and an interpolation calculated interpolation value between each sample points to a memory unit; wherein the memory unit converts to the second video signal of a corresponding signal level based on the conversion table according to the signal level of the input first video signal, and outputs the second video signal.

12 Claims, 12 Drawing Sheets

VIDEO SIGNAL PROCESSING DEVICE AND VIDEO SIGNAL PROCESSING METHOD

BACKGROUND OF THE INVENTION

1. Technical Field

The present invention relates to a video signal processing device and a video signal processing method for inputting a video signal, which is converted based on a predetermined table with respect to an input video signal, and output to a display panel.

2. Background Art

In recent years, a plasma display device using a plasma display panel (PDP), which can be thinned or whose screen can be enlarged, is widely known. The gamma property, which is the relationship of the video output with respect to an input video signal in the plasma display panel, differs from the gamma property of a conventional CRT, and also differs from the gamma property of a liquid crystal display (LCD), which can be thinned or whose screen can be enlarged similar to the plasma display panel.

In the current television broadcast, a gamma correction process is performed in advance on the video signal to cancel out the gamma property of the CRT on the transmission side. Thus, if the equipment on the reception side is PDP or LCD other than the CRT, gamma correction corresponding to the receiving equipment needs to be performed on the received video signal.

A specific gamma correction method is described in Japanese Patent Laid-open Publication No. 2001-184016. Japanese Patent Laid-open Publication No. 2001-184016 discloses gamma correcting an RGB video signal. An R gamma value, a G gamma value, and a B gamma value, which are recorded in a gamma ROM, are stored in an SRAM in order to provide high-speed processing. The gamma correction is performed on the input RGB video signal based on the gamma correction data stored in an R-SRAM, a G-SRAM, and a B-SRAM.

SUMMARY OF THE INVENTION

However, in the above gamma correction device, gamma correction data of various patterns need to be stored in the gamma ROM, and thus the storage capacity needs to be increased which increases the manufacturing cost.

It is an object of the present invention to provide a video signal processing device capable of easily changing the gamma property according to the desires of the user, and capable of reducing the storage capacity necessary for gamma correction.

A video signal processing device according to the present invention relates to a video signal processing device for converting an input first video signal to a second video signal, and inputting the second video signal to a display panel, the video signal processing device including an input unit for receiving an input of a set value of a signal level of the second video signal to be converted and output in correspondence to a signal level of the first video signal for each of a plurality of sample points of the signal level of the first video signal; a calculating unit for interpolation calculating the signal level of the second video signal to be converted and output for the signal level between each sample points of the first video signal; and a control unit for transferring a conversion table from the first video signal to the second video signal including a set value of the second video signal for each sample point of the first video signal and an interpolation value of the interpolation calculated second video signal between each sample points to a memory unit; wherein the memory unit converts to the second video signal of a corresponding signal level based on the transferred conversion table according to the signal level of the input first video signal, and outputs the second video signal.

The calculating unit may perform the interpolation calculation of the second video signal between each sample points by polynomial approximation. Furthermore, the calculating unit may perform the interpolation calculation of the second video signal between each sample points in a video blanking period in which a video of the display panel is not displayed.

The video signal processing device further includes a set value change detecting unit for detecting change in the set value of the signal level of the second video signal to be converted and output for each sample point of the first video signal; a recalculation interval detecting unit for detecting an interval that requires recalculation of the interpolation calculation when the set value is changed; and a recalculating unit for performing recalculation for the interval that requires the recalculation.

The recalculating unit may include two or more types of calculating units differing in time necessary for recalculation.

The recalculating unit preferably includes a low-order approximate calculating unit for performing interpolation calculation with low-order polynomial approximation, and a high-order approximate calculating unit for performing interpolation calculation with high-order polynomial approximation.

The video signal processing device may further include a recalculation time determining unit for comparing the time necessary for recalculation of the interpolation calculation and a video blanking period in which a video of the display panel is not displayed. In this case, the recalculating unit performs recalculation by controlling the low-order approximate calculating unit and the high-order approximate calculating unit based on the determination of the recalculation time determining unit.

If recalculation is performed by the low-order approximate calculating unit, the recalculating unit may perform recalculation with the high-order approximate calculating unit for the interval calculated with the low-order approximate calculating unit after the next video blanking period.

The input unit may include a selecting unit for selecting from a plurality of set value sets provided in advance and receiving an input for the signal level of the second video signal to be converted and output in correspondence to the signal level of the first video signal for each of the plurality of sample points.

The video signal processing device may further include the memory unit for converting to the second video signal of the corresponding signal level based on the transferred conversion table according to the signal level of the input first video signal, and outputting the second video signal.

A video signal processing method according to the present invention relates to a video signal processing method for converting an input first video signal to a second video signal, and inputting the second video signal to a display panel, the video signal processing method including: receiving an input of a set value of a signal level of a second video signal to be converted and output in correspondence to a signal level of the first video signal for each of a plurality of sample points of the signal level of the first video signal; interpolation calculating the signal level of the second video signal to be converted and output for the signal level between each sample points of the first video signal; and forming a conversion table including a set value of the second video signal for each sample point of the first video signal and an interpolation calculated second video signal between each sample points; and converting the corresponding second video signal based on the conversion table for the input first video signal, and outputting the second video signal.

A video signal processing program according to the present invention relates to a video signal processing program for causing a computer to execute a video signal processing method for converting an input first video signal to a second video signal, and inputting to a display panel, the method including: receiving an input of a set value of a signal level of a second video signal to be converted and output in correspondence to a signal level of the first video signal for each of a plurality of sample points of the signal level of the first video signal; interpolation calculating the signal level of the second video signal to be converted and output for the signal level between each sample points of the first video signal; and forming a conversion table including a set value of the second video signal for each sample point of the first video signal and an interpolation calculated second video signal between each sample points; and converting the corresponding second video signal based on the conversion table for the input first video signal, and outputting the second video signal.

According to the video signal processing device of the present invention, the second video signal between each sample is interpolation calculated based on the set value of the second video signal to be converted for each sample point of the first video signal to be input, and the conversion table from the first video signal to the second video signal is generated for all the signal levels. Furthermore, the input first video signal is converted to the second video signal based on the generated conversion table, and output the second video signal. Thus, the conversion table for converting and outputting the input first video signal to the second video signal does not need to be stored in a recording device for all the signal levels, and the storage capacity can be reduced.

Furthermore, since interpolation calculation and the generation of the conversion table are performed in the video blanking period, the display video will not be discontinuous, and the conversion table can be easily changed by simply specifying the output level of the sample point as desired by the user.

BRIEF DESCRIPTION OF THE DRAWINGS

The present invention will become readily understood from the following description of preferred embodiments thereof made with reference to the accompanying drawings, in which like parts are designated by like reference numeral and in which.

DETAILED DESCRIPTION OF THE PREFERRED EMBODIMENTS

Figure 1:
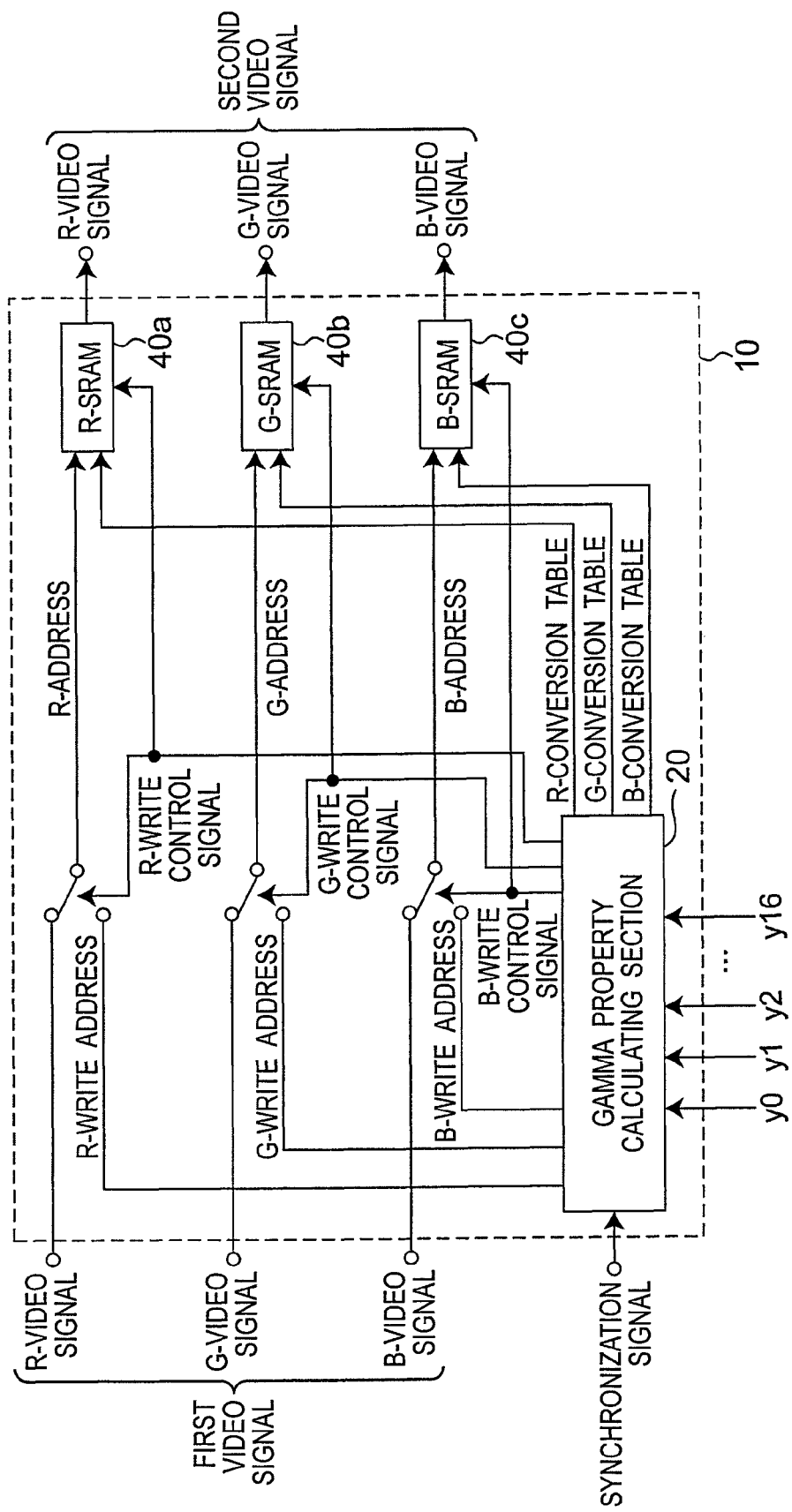
FIG. 1 is a schematic view showing a configuration of a video signal processing device according to a first embodiment of the present invention.

A video signal processing device according to an embodiment of the present invention will be described using the accompanied drawings. The same reference numerals are denoted for substantially the same members throughout the drawings.

First Embodiment

As shown in FIG. 1, a video signal processing device 10 according to a first embodiment of the present invention includes a memory unit (R-SRAM 40a, G-SRAM 40b, B-SRAM 40c) and a gamma property calculating unit 20. The memory unit converts an input first video signal such as an R-video signal, a G-video signal, and a B-video signal to a corresponding second video signal based on a predetermined conversion table. The gamma property calculating unit 20 outputs a conversion table for converting from the first video signal to the second video signal based on a set value of the second video signal to be converted and output with respect to the first video signal of a plurality of sample points. The first video signal is, for example, a received video signal, and the second video signal is a video signal to be input to the display panel.

Figure 2:
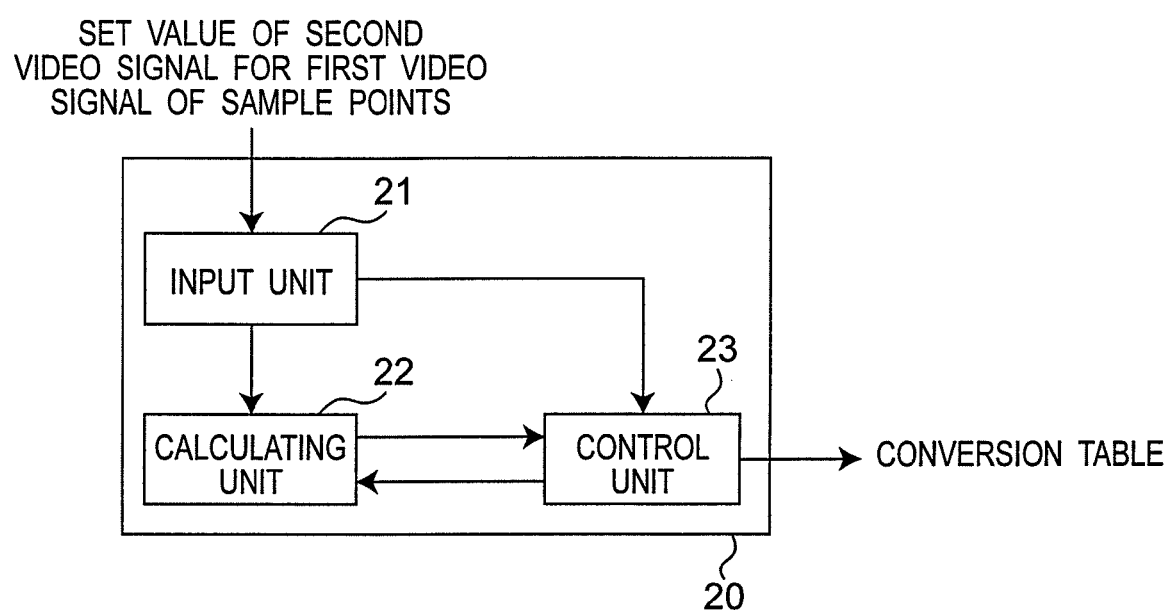
FIG. 2 is a block diagram showing a configuration of a gamma property calculating unit of FIG. 1.
Figure 3:
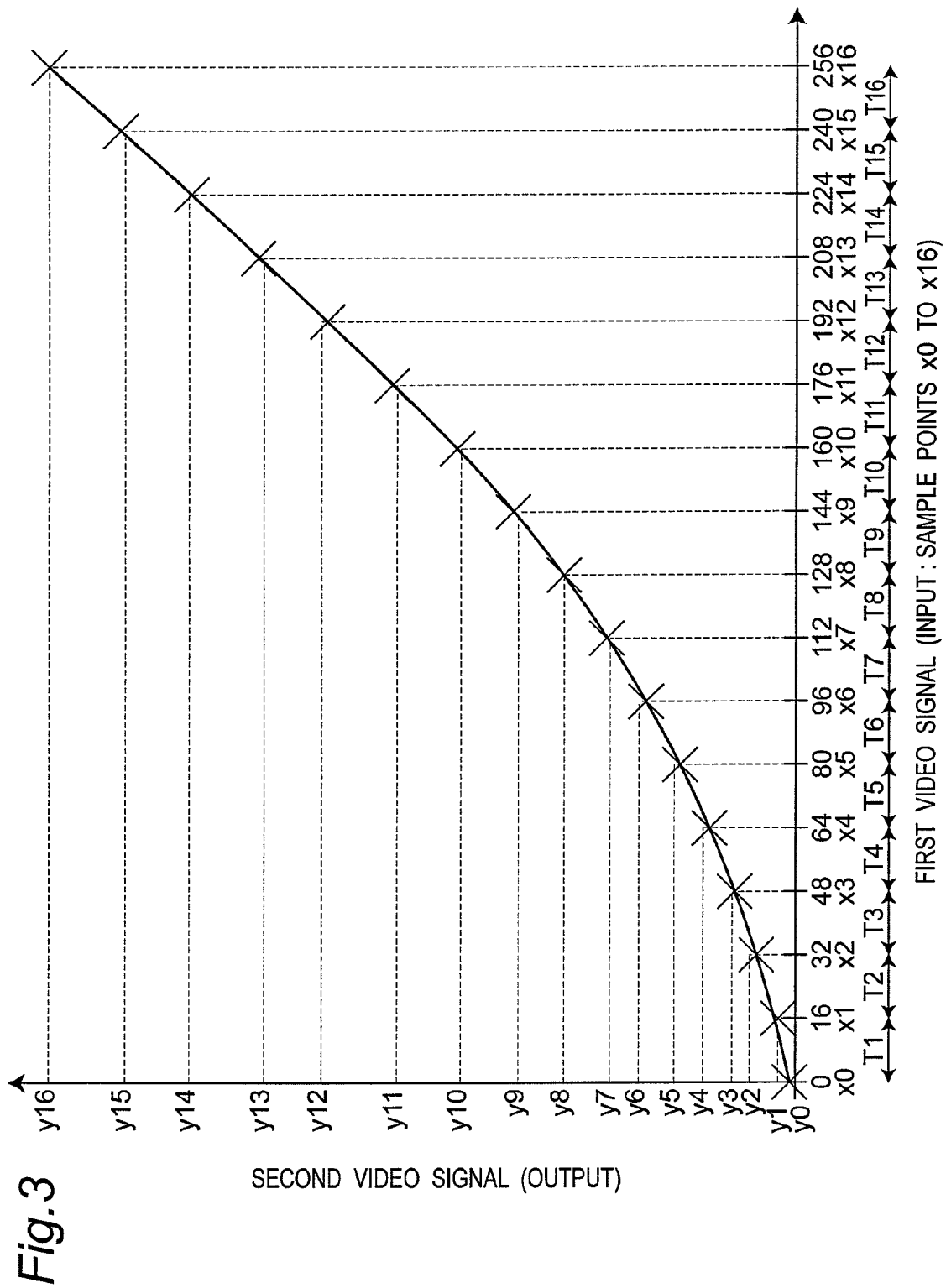
FIG. 3 is a view showing a conversion table including a set value of each sample point of a second video signal to be converted and output, and an interpolation calculated interpolation value between each samples for an input first video signal.

FIG. 2 is a block diagram showing a configuration of the gamma property calculating unit 20, which is a configuring member of the video signal processing device 10. The gamma property calculating unit 20 includes an input unit 21, a calculating unit 22, and a control unit 23. The input unit 21 receives an input of the set value of the second video signal to be converted and output with respect to seventeen sample points of the signal level of the input first video signal. The calculating unit 22 interpolation calculates the signal level of the second video signal to be converted and output with respect to the signal level between each sample points of the first video signal. The control unit 23 transfers the conversion table from the first video signal to the second video signal to the R-SRAM 40a, G-SRAM 40b, and the B-SRAM 40c, which are the memory units. The conversion table includes the set value of the second video signal for each sample point of the first video signal, and the interpolation value of the interpolation calculated second video signal between each sample points.

Figure 4:
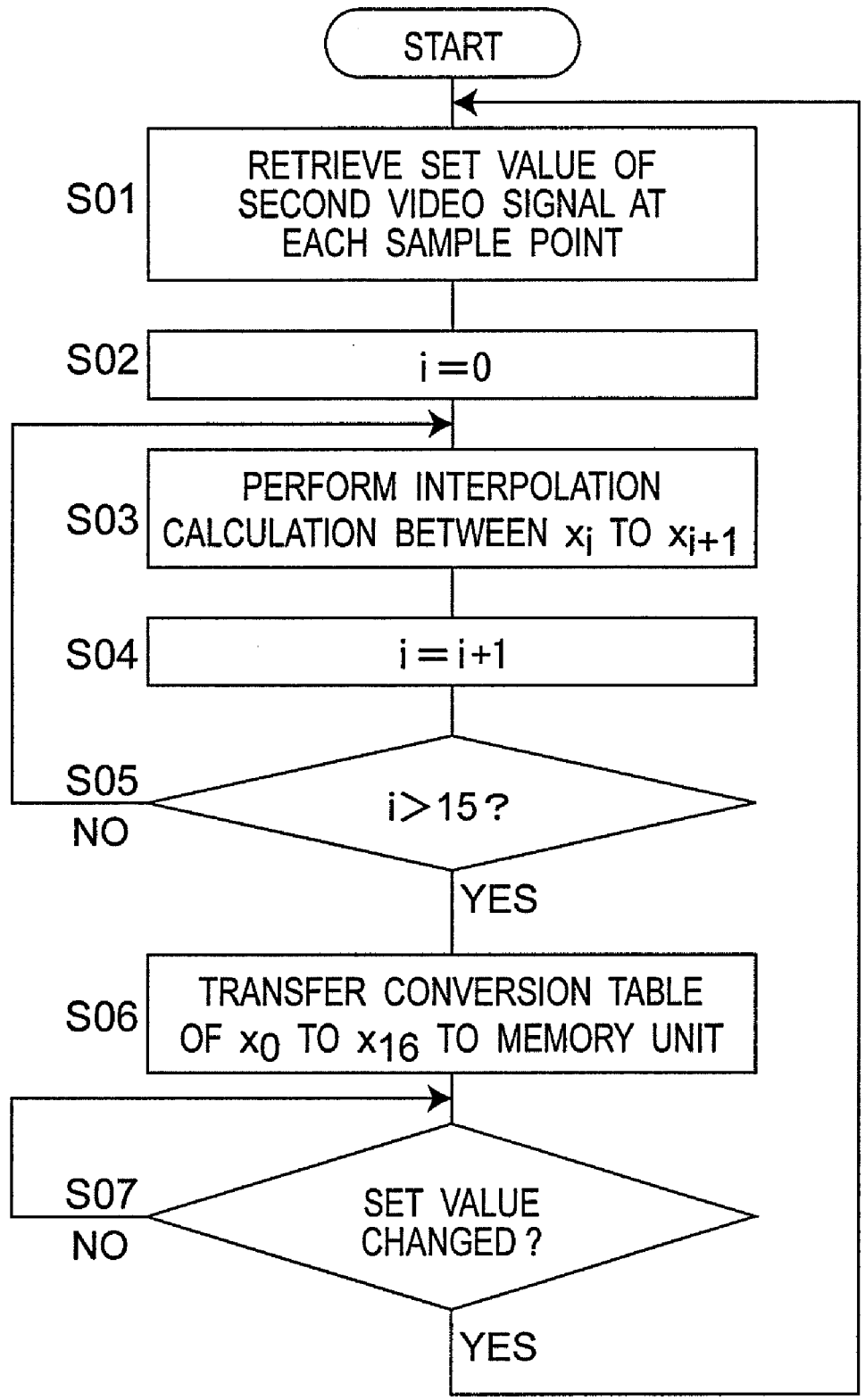
FIG. 4 is a flowchart for creating a conversion table in the video signal processing method according to the first embodiment of the present invention.

The video signal processing method in the video signal processing device 10 will now be described using FIG. 4 and FIG. 5. The video signal processing method is executed in the gamma property calculating unit 20 and the R-SRAM 40a, G-SRAM 40b, and the B-SRAM 40c, which are the memory units. FIG. 4 is a flowchart of a method of creating a conversion table in the gamma property calculating unit 20. This flowchart will be described below.

(a) The set value of the second video signal at each sample point (x0 to x16) of the first video signal is retrieved (S01). In this case, as an example in which the signal level (tone level) of the first video signal is 256 tones, 0 to 256 tones are divided at equal interval. The sample points are set, and the set value of the second video signal to convert is provided for the seventeen sample points x0 to x16.

(b) Integer 0 is substituted to i, that is defined as (i=0) (S02). This is to handle from 0 to 16 in order as the seventeen sample points x0 to x16 are numbered as 0 to 16. This may be carried out in reverse order.

(c) Interpolation calculation between the sample points $x_i$ to $x_{i+1}$ is performed (S03). The interpolation calculation method is not limited to a case of calculating for every interval, and the interpolation calculation may be performed on the entire interval.

(d) Parameter i is incremented, that is defined as (i=i+1) (S04).

(e) It is determined whether or not integer i exceeds 15 (S05). Determination is then made on whether or not the interpolation calculation is performed on the entire interval between the seventeen sample points. The process proceeds to step S06 if the interpolation calculation is performed on the entire interval, and the process returns to step S03 if the interval not performed with the interpolation calculation exists.

(f) If the interpolation calculation is performed on the entire interval, the conversion table from the first video signal to the second video signal between the sample points x0 to x16 is transferred to the R-SRAM 40a, the G-SRAM 40b, and the B-SRAM 40c, which are the memory units (S06). In this case, the conversion table is transferred after the interpolation calculation is terminated on the entire interval, but it is not limited thereto, and the interpolation result may be transferred for each interpolation calculation in each interval.

(g) It is determined whether or not the set value is changed (S07). The process returns to step S01 if the set value is changed. Step S07 is repeated if the set value is not changed.

The conversion table from the first video signal to the second video signal is generated in the gamma property calculating unit 20 in the above manner, and transferred to the R-SRAM 40a, the G-SRAM 40b, and the B-SRAM 40c, which are the memory units.

Figure 5:
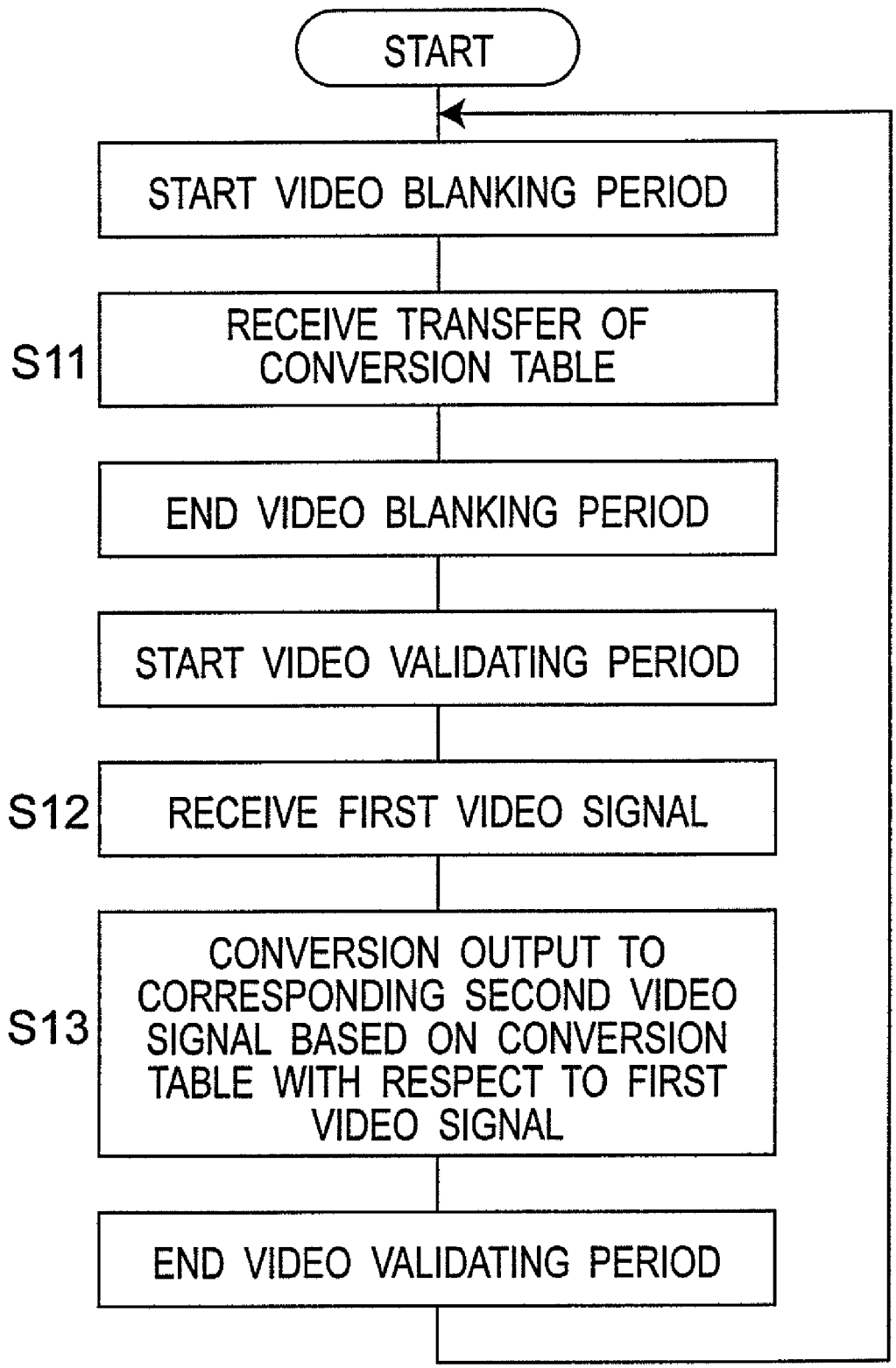
FIG. 5 is a flowchart for converting and outputting the first video signal to the second video signal based on the conversion table in the video signal processing method according to the first embodiment of the present invention.

FIG. 5 is a flowchart of a method of converting from the input first video signal to the second video signal in the R-SRAM 40a, the G-SRAM 40b, and the B-SRAM 40c, which are the memory units, and outputting the second video signal. The flowchart will be described below.

(a) Transfer of the conversion table from the gamma property calculating unit 20 with the start of a video blanking period is received (S11). The conversion table can be rewritten only during the video blanking period.

(b) After the end of the video blanking period, video validating period starts. The input first video signal is received in the memory units 40a, 40b, and 40c (S12).

(c) The input first video signal is converted to the corresponding second video signal based on the conversion table with respect to the first video signal, and the second video signal is output (S13). For instance, with the signal level of the input first video signal as the address, R-SRAM 40a, G-SRAM 40b, and B-SRAM 40c can output the second video signal of the signal level recorded in the relevant address. In this case, the R-SRAM 40a, the G-SRAM 40b, and the B-SRAM 40c itself can serve as a conversion table.

(d) After the end of the video validating period, the video blanking period starts, and it is returned to step S11.

The input first video signal is converted to the second video signal based on the conversion table in memory units, R-SRAM 40a, the G-SRAM 40b, and the B-SRAM 40c, and the second video signal is output, in the above manner.

Therefore, in the video signal processing device and the video signal processing method according to the first embodiment, the second video signal between each samples is interpolation calculated based on the set value of the second video signal to be converted for each sample point of the input first video signal. Thus, the conversion table from the first video signal to the second video signal is generated for all the signal levels. Furthermore, the input first video signal is converted to the second video signal based on the generated conversion table, and the second video signal is output. It is not necessary to store the gamma correction data for converting the input first video signal to the second video signal for all the signal levels in recording means or the like, and outputting. The gamma correction of various patterns can be performed without increasing the storage capacity.

Second Embodiment

Figure 6:
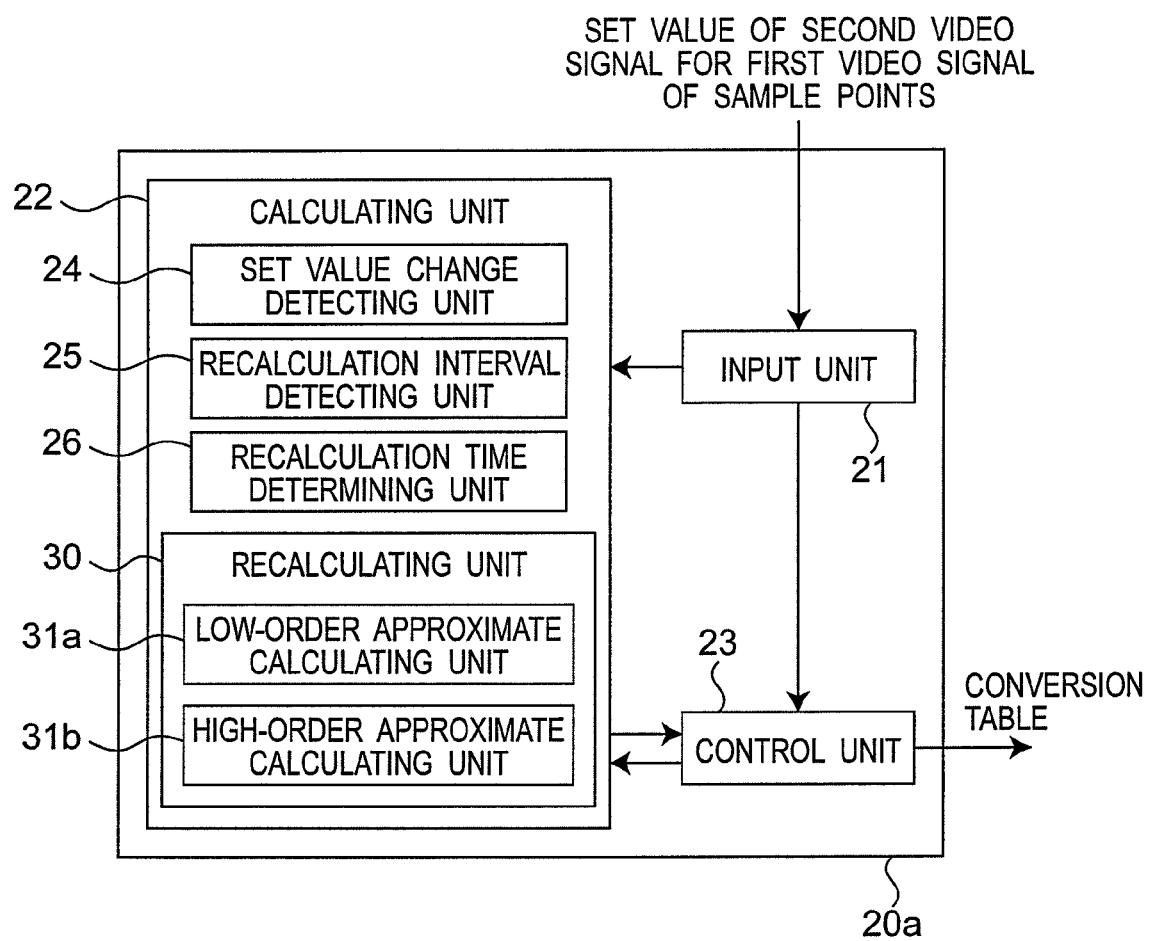
FIG. 6 is a block diagram showing a configuration of a gamma property calculating unit of a video signal processing device according to a second embodiment of the present invention.

FIG. 6 is a block diagram showing a configuration of a gamma property calculating unit 20a of a video signal processing device according to a second embodiment of the present invention. The gamma property calculating unit 20a differs in the configuration of a calculating unit 22 compared to the gamma property calculating unit 20 configuring the video signal processing device of the first embodiment. In other words, the gamma property calculating unit 20a includes a set value change detecting unit 24, a recalculation interval detecting unit 25, a recalculation time determining unit 26, and a recalculating unit 30 in the calculating unit 22. The set value change detecting unit 24 detects the change in the set value of the signal level of the second video signal to be converted and output with respect to each sample point of the first video signal. The recalculation interval detecting unit 25 detects the interval that requires recalculation of the interpolation calculation when the set value is changed. The recalculation time determining unit 26 compares the time necessary for the recalculation of the interpolation calculation and the video blanking period in which the video of the display panel is not displayed. The recalculating unit 30 performs recalculation for the interval that requires recalculation. The recalculating unit 30, specifically, includes a low-order approximate calculating unit 31a which performs interpolation calculation with low-order polynomial approximation, and a high-order approximate calculating unit 31b which performs interpolation calculation with high-order polynomial approximation.

Figure 7:
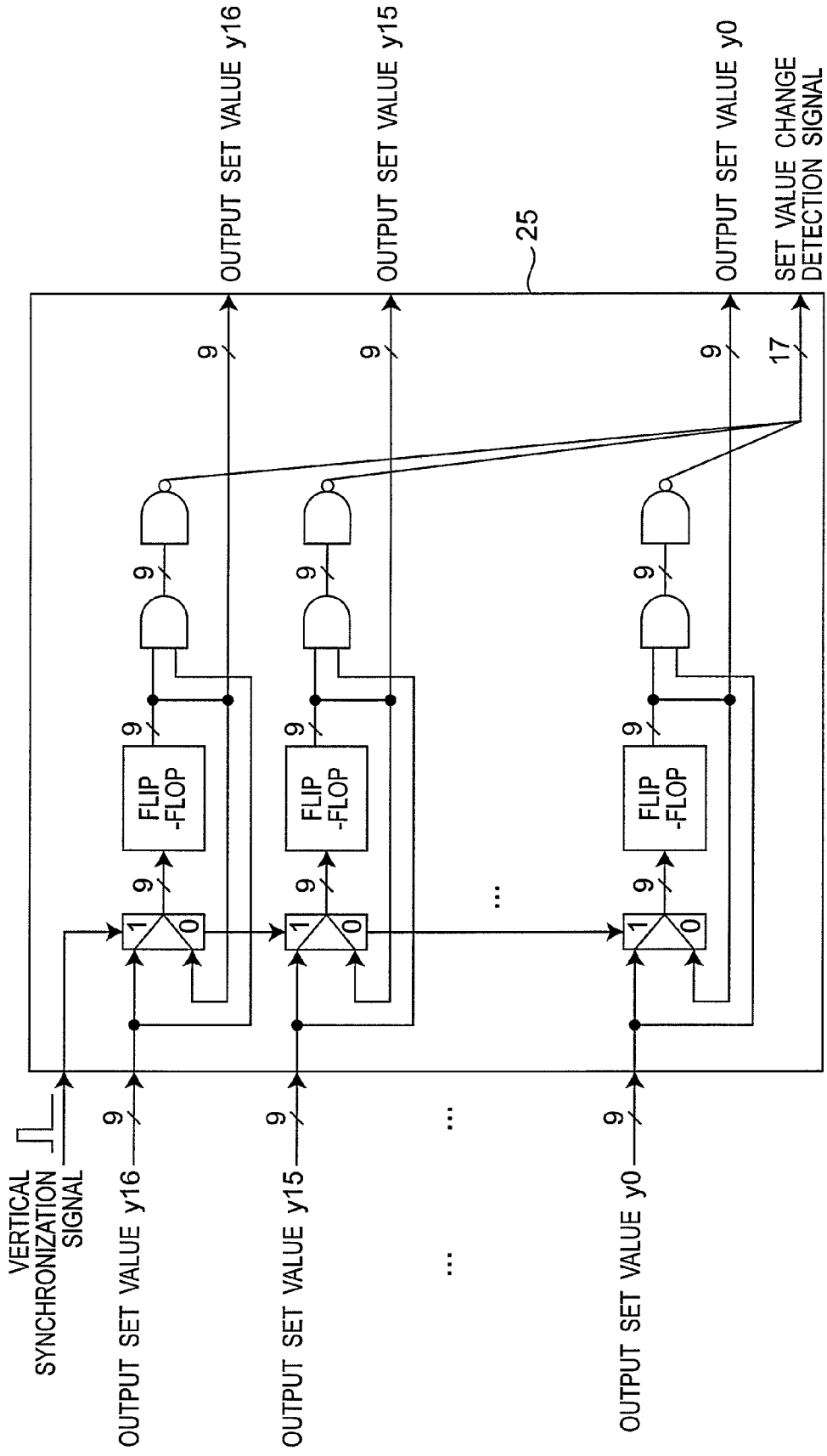
FIG. 7 is a block diagram showing a configuration of a recalculation interval detecting unit.
Figure 8:
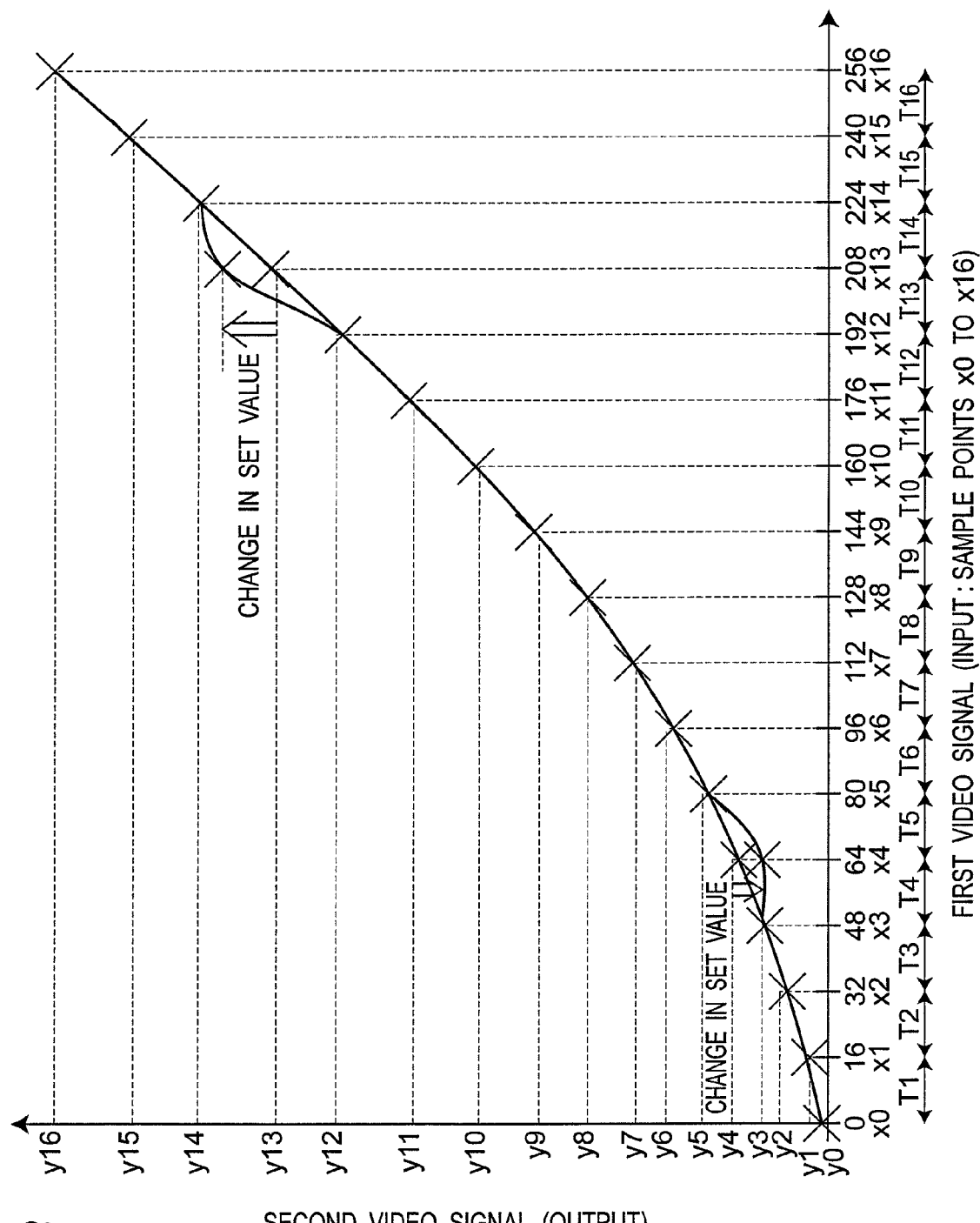
FIG. 8 is a view showing a conversion table recalculated when the set value of each sample point of the second video signal to be converted and output is changed with respect to the input first video signal.
Figure 9:
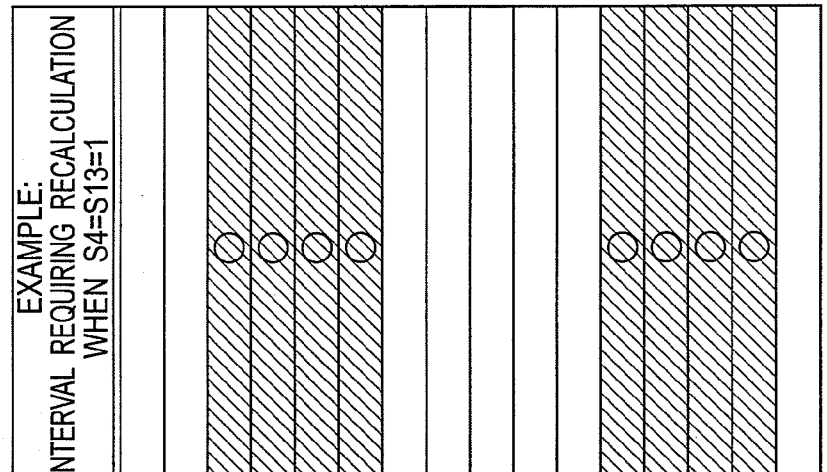
FIG. 9A is a view showing an interval that requires recalculation according to the changed set value when the set value of each sample point of the second video signal to be converted and output is changed with respect to the input first video signal.
FIG. 9B is a view showing an interval that requires recalculation when the set values of y4 and y13 are changed.

FIG. 7 is a circuit diagram showing one unit of the configuration of the recalculation interval detecting unit 25. FIG. 8 is a schematic view of a conversion table showing a relationship between the sample point of the first video signal and the set value of the second video signal to be converted and output. FIG. 8 shows an example of a case where the set value of the second video signal is changed for two sample points x14 and x13. FIG. 9 is a relational diagram showing an interval that requires recalculation according to the sample point at where change in set value is detected in the circuit of FIG. 7. The recalculation interval detecting unit 25 detects the sample point at which the output set value is subsequently changed with respect to the output set value immediately before. The recalculation interval detecting unit 25 outputs a set value change detection signal, (e.g., value "1" for S4 and S13), as shown in the circuit of FIG. 7. According to the polynomial approximation for performing interpolation calculation, the interval that requires recalculation is detected based on the relational diagram of FIGS. 9A and 9B. For instance, as shown in FIG. 8, if the set value of the second video signal is changed for two sample points x4 and x13, it is necessary to recalculate for four intervals T3 to T6 with respect to the sample point x4 (S4=1), and it is necessary to recalculate for four intervals T12 to T15 with respect to the sample point x13 (S13=1) from the relational diagram of FIGS. 9A and 9B. The configuration of the recalculation interval detecting unit 25 is not limited to the example of FIG. 7.

Figure 10:
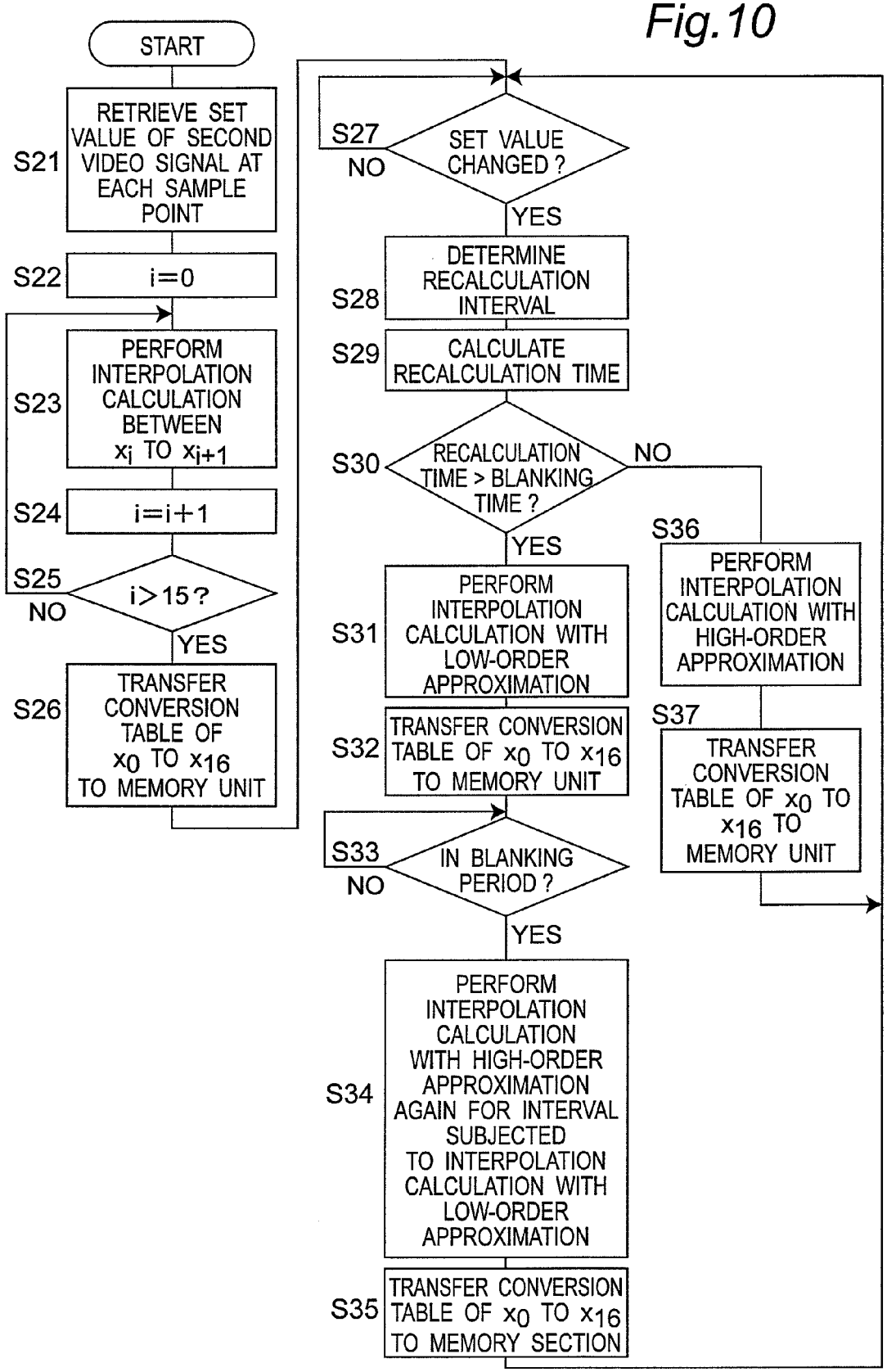
FIG. 10 is a flowchart for creating the conversion table in a video signal processing method according to the second embodiment of the present invention.

FIG. 10 is a flowchart of a video signal processing method of the gamma property calculating unit 20*a* of the video signal processing device 10 according to the second embodiment. This flowchart includes substantially the same procedures (S21 to S27) up to step S07 as the flowchart of FIG. 4, but differs in that steps S28 to S37 related to recalculation are additionally included. The redundant area from steps S21 to S27 will be briefly described, and steps S28 to S37 related to recalculation will be described in detail.

(a) The set value of the second video signal at each sample point (x0 to x16) of the first video signal is retrieved (S21).

(b) Integer 0 is substituted to parameter i, that is defined as (i=0) (S22).

(c) Interpolation calculation between the sample points $x_i$ to $x_{i+1}$ is performed (S23).

(d) Parameter i is incremented, that is defined as (i=i+1) (S24). The process proceeds to step S26 if the interpolation calculation is performed on the entire interval, and the process returns to S23 if the interval not performed with the interpolation calculation exists.

(e) If the interpolation calculation is performed on the entire interval, the conversion table from the first video signal to the second video signal between the sample points x0 to x16 is transferred to the R-SRAM 40*a*, the G-SRAM 40*b*, and the B-SRAM 40*c*, which are the memory units (S26).

(f) It is determined whether or not the set value is changed (S27). The process proceeds to the next step S28 if the set value is changed. Step S27 is repeated if the set value is not changed.

(g) The recalculation interval is determined if the set value is changed (S28). If the set value is merely changed for some sample points, recalculation of the entire interval may not be necessary, and recalculation may be performed only on the necessary intervals. For instance, in the example of FIG. 8 and FIGS. 9A and 9B, it is necessary to recalculate for four intervals T3 to T6 with respect to the change of the sample point x4. Furthermore, it is necessary to recalculate for four intervals T12 to T15 with respect to the change of the sample point x13.

(h) Necessary recalculation time is calculated (S29).

(i) It is determined whether or not the necessary recalculation time is longer than the video blanking time (S30). For instance, in order to perform interpolation calculation on the entire interval and generate the conversion table, time longer than or equal to at least two vertical periods is required. If the time necessary for recalculation is longer than the video blanking period, the time is not enough to perform the interpolation calculation with high-order approximation, and thus the process proceeds to step S31 in which interpolation calculation with low-order approximation is performed. If the time necessary for recalculation is shorter than the video blanking period, the process proceeds to step S36 in which interpolation calculation with high-order approximation is performed.

(j) If it is determined that there is not enough recalculation time in step S30, interpolation calculation with low-order approximation is performed (S31). For instance, interpolation calculation is performed by using a straight line approximation.

(k) The conversion table between the sample points x0 to x16 is transferred to the memory unit (S32). In this case, the original conversion table is rewritten with respect to the recalculated interval. The interpolation recalculation in high-order approximation needs to be performed again for the area subjected to the interpolation calculation with low-order approximation. The following interpolation calculation is performed again.

(l) Firstly, it is determined whether or not the current time belongs to the blanking period (S33). The conversion table is obtained as a result of performing the interpolation calculation again. The conversion table can be transferred to the memory unit only during the blanking period. Thus, the interpolation calculation is performed over, and the result thereof is transferred to the memory unit during the blanking period.

(m) The interpolation calculation with high-order approximation is performed again for the interval subjected to the interpolation calculation with low-order approximation (S34).

(n) The conversion table between the sample points x0 to x16 transferred to the memory unit (S35). In this case, the original conversion table is rewritten for the interval in which the interpolation calculation is again performed.

(o) If it is determined that there is enough recalculation time in step S30, interpolation in high-order approximation is performed (S36). For instance, interpolation is performed by using a three-dimensional function approximation.

(p) The conversion table between the sample points x0 to x16 is transferred to the memory unit (S37). In this case, the original conversion table is rewritten for the recalculated interval.

Therefore, if the set value is changed for some sample points, the interval to perform recalculation is determined, the interpolation calculation is performed in low-order approximation or high-order approximation according to the time necessary for recalculation, and the conversion table is transferred.

Figure 11:
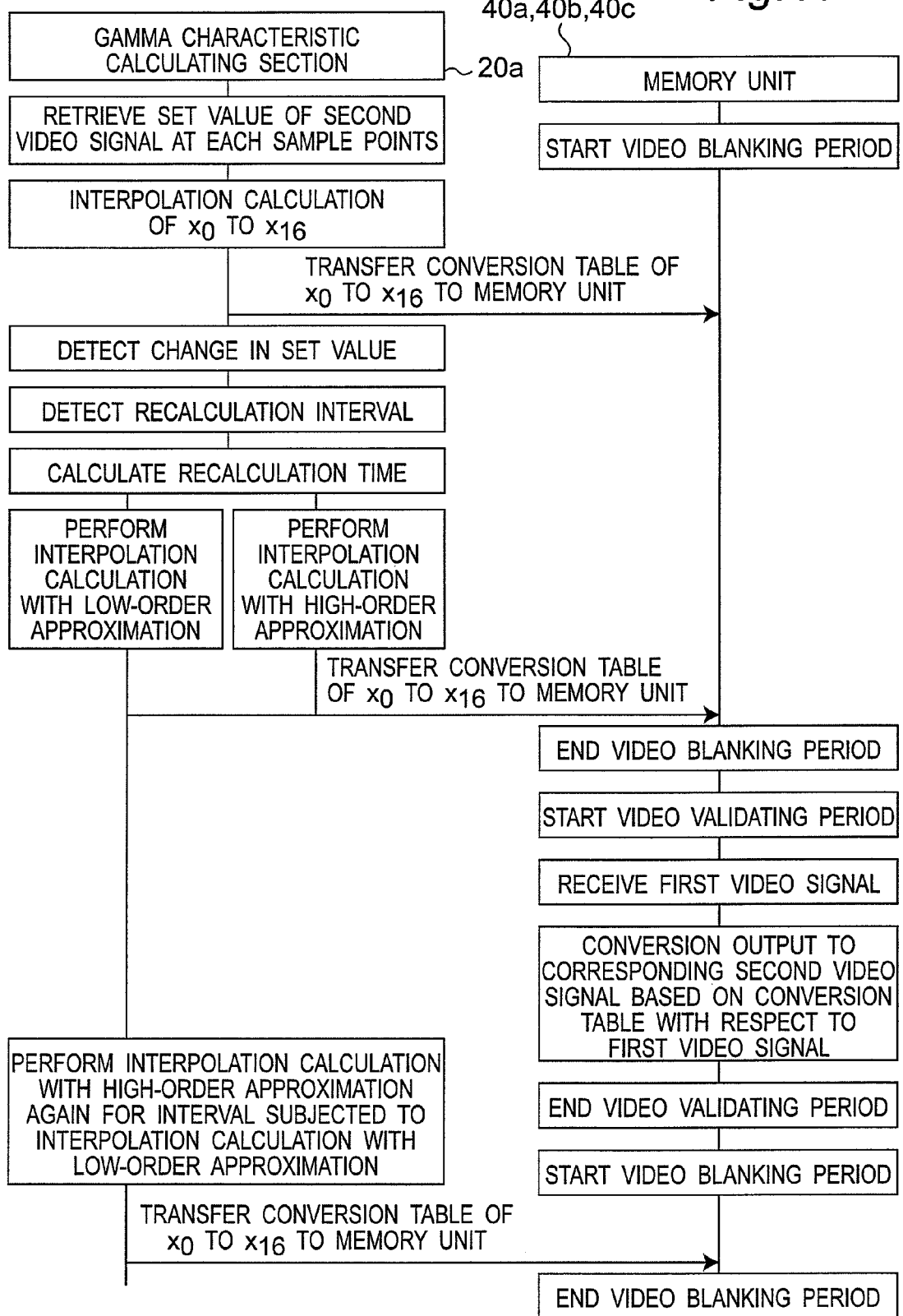
FIG. 11 is a timing chart showing a relationship between the video blanking period and the video validating period in the gamma property calculating unit and the memory unit in the video signal processing method according to the second embodiment of the present invention.

FIG. 11 is a timing chart showing a relationship between each step executed in the gamma property calculating unit 20*a* and the R-SRAM 40*a*, the G-SRAM 40*b*, and the B-SRAM 40*c*, which are the memory units, and the video blanking period and the video validating period. Recalculation is performed within the video blanking period. Thus, interpolation calculation with high-order approximation is performed if there is enough time. The interpolation calculation with low-order approximation is performed in the first video blanking period if there is not enough time. Thereafter, the interpolation calculation with high-order approximation is performed again in the next video blanking period for the interval subjected to the interpolation calculation with low-order approximation in the first video blanking period.

In this case, even if the set value is changed for some sample points, time longer than or equal to at least two vertical periods is required to perform interpolation calculation on the entire interval and generate the conversion table, where the screen is in a blackout state when exceeding the video blanking period. The screen in the blackout state gives an uncomfortable feeling to the user even if it is a short period of time.

According to the video signal processing device and the video signal processing method of the second embodiment, if the set value is changed for some sample points, the interval to perform recalculation is determined, the interpolation calculation is performed in low-order approximation or high-order approximation according to the time necessary for recalculation, and the conversion table is transferred in the video blanking period. Since the interval that requires recalculation is determined, the recalculation time can be shortened. Furthermore, since the recalculation and the transfer of the conversion table within the video blanking period can be performed, a blackout does not occur, and screen adjustment can be performed without giving an uncomfortable feeling to the user. In this case, with respect to the interval in which recalculation is interpolation calculated in the low-order approximation, the interpolation calculation with high-order approximation is performed in the subsequent video blanking period. The rough screen adjustment due to interpolation calculation with low-order approximation is only carried out during a short period of time. The conversion table can be replaced with revised conversion table including interpolation calculated in high-order approximation thereafter. Thus, accurate screen adjustment can be carried out.

Third Embodiment

Figure 12:
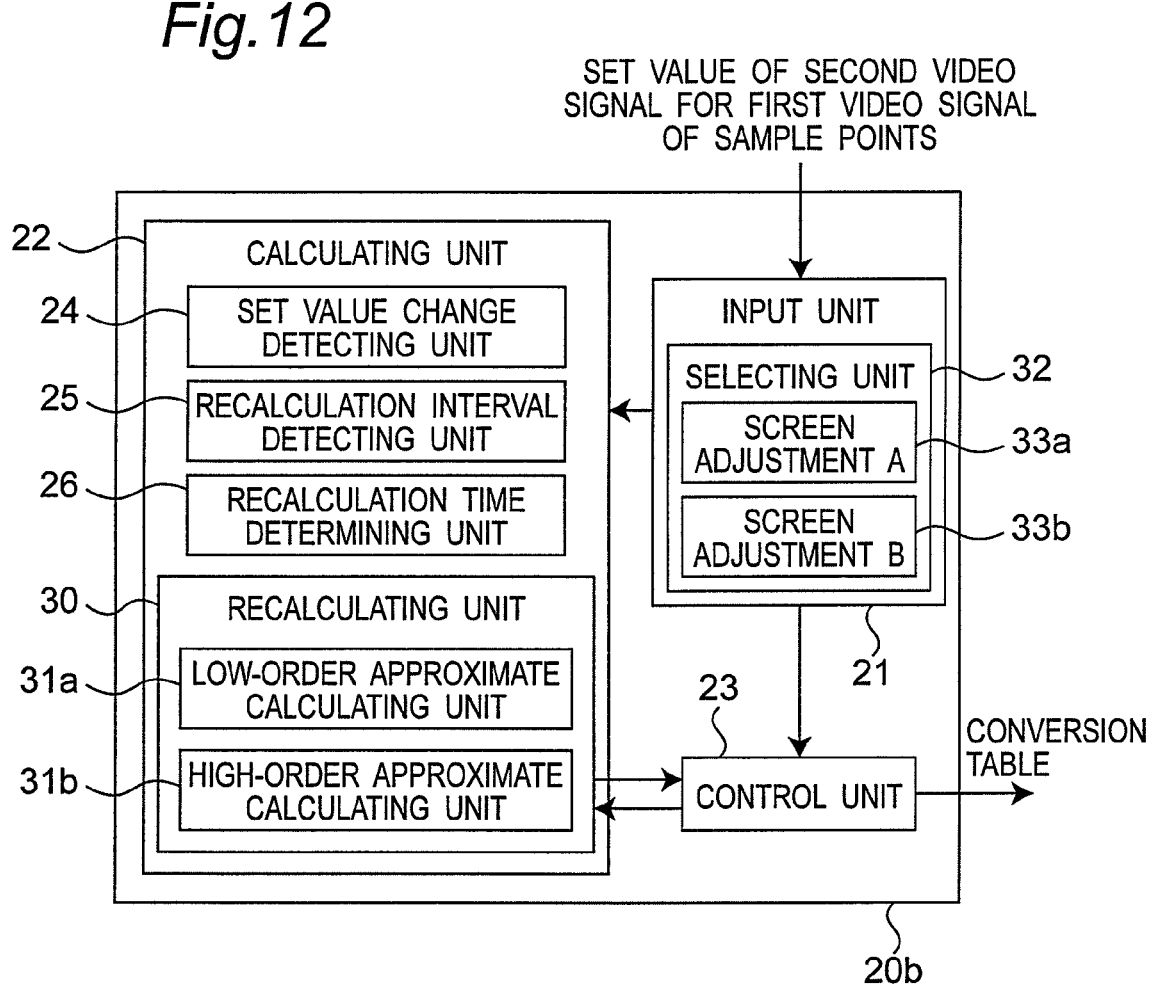
FIG. 12 is a block diagram showing a configuration of a gamma property calculating unit of a video signal processing device according to a third embodiment of the present invention.

FIG. 12 is a block diagram showing a configuration of a gamma property calculating unit 20b of a video signal processing device according to a third embodiment of the present invention. The gamma property calculating unit 20b differs from the gamma property calculating unit 20a of the video signal processing device of the second embodiment in that a selecting unit 32 is arranged in an input unit 21. The selecting unit 32 selects from a plurality of set value sets provided in advance, and receives input with respect to the signal level of the second video signal to be converted and output in correspondence to the signal level of the first video signal for each of the plurality of sample points. The selecting unit 32 may include a screen adjustment A (33a), a screen adjustment B (33b), or the like, which is a set value set of the second video signal to be converted and output for each sample point.

Examples of the screen adjustment A (33a) and the screen adjustment B (33b) are set value sets of the second video signal to be converted and output for each sample point. They include a movie mode, an animation mode, and the like. In the video mode, it is a screen adjustment set value set in which the entire screen is dark but the tone is distinct.

In the video signal processing device, the gamma property calculating unit 10b includes the selecting unit 32 for selecting from the plurality of set value sets such as the image adjustment A (33a) and the image adjustment B (33b), and receiving an input. Thus, it is not necessary to set for a plurality of sample points respectively, such that the set value sets can be easily set all at once. Furthermore, the desired image adjustment can be performed by simply selecting from various image adjustment sets prepared in advance.

The video signal processing device according to the present invention can be used as a gamma correction circuit etc. for converting and outputting the input video signal based on a predetermined conversion table, and inputting the same to the display. The video signal processing device can be used as a video signal processing device enabling the user to arbitrarily set the screen adjustment of the display.

The invention claimed is:

1. A video signal processing device for converting an input first video signal to a second video signal, and inputting the second video signal to a display panel, the video signal processing device comprising:
   an inputter that receives an input of a set value of a signal level of the second video signal to be converted and output in correspondence to a signal level of the first video signal for each of a plurality of sample points of the signal level of the first video signal;
   a calculator that calculates interpolation of the signal level of the second video signal to be converted and output for the signal level between each of the sample points of the first video signal; and
   a controller that transfers a conversion table from the first video signal to the second video signal including a set value of the second video signal for each of the sample point of the first video signal and an interpolation value of the interpolation calculated second video signal between each of the sample points to a memory,
   wherein the memory converts to the second video signal of a corresponding signal level based on the transferred conversion table according to the signal level of the input first video signal, and outputs the second video signal.

2. The video signal processing device according to claim 1, wherein the calculator performs the interpolation calculation of the second video signal between each of the sample points by polynomial approximation.

3. The video signal processing device according to claim 1, wherein the calculator performs the interpolation calculation of the second video signal between each of the sample points in a video blanking period in which a video of the display panel is not displayed.

4. The video signal processing device according to claim 1, further comprising:
   a set value change detector that detects change in the set value of the signal level of the second video signal to be converted and output for each sample point of the first video signal;
   a recalculation interval detector that detects an interval that requires recalculation of the interpolation calculation when the set value is changed; and
   a recalculator that performs recalculation for the interval that requires the recalculation.

5. The video signal processing device according to claim 4, wherein the recalculator includes two or more calculating units each having a recalculation time different from each other.

6. The video signal processing device according to claim 4, wherein the recalculator includes,
   a low-order approximate calculator that performs interpolation calculation with low-order polynomial approximation, and
   a high-order approximate calculator that performs interpolation calculation with high-order polynomial approximation.

7. The video signal processing device according to claim 6, further comprising:

a recalculation time determiner that compares the recalculation time of the interpolation calculation and a video blanking period in which a video of the display panel is not displayed,
wherein the recalculator is operable to perform recalculation by controlling the low-order approximate calculator and the high-order approximate calculator based on the determination of the recalculation time determiner.

8. The video signal processing device according to claim 7, wherein if recalculation is performed by the low-order approximate calculator, the recalculator performs recalculation with the high-order approximate calculator for the interval calculated with the low-order approximate calculator after the next video blanking period.

9. The video signal processing device according to claim 1, wherein the inputter includes a selector that selects from a plurality of set value sets provided in advance and receives an input for the signal level of the second video signal to be converted and output in correspondence to the signal level of the first video signal for each of the plurality of sample points.

10. The video signal processing device according to claim 1, further comprising a memory that converts to the second video signal of the corresponding signal level based on the transferred conversion table according to the signal level of the input first video signal, and outputs the second video signal.

11. A video signal processing method for converting an input first video signal to a second video signal, and inputting the second video signal to a display panel, the video signal processing method comprising:
    receiving an input of a set value of a signal level of a second video signal to be converted and output in correspondence to a signal level of the first video signal for each of a plurality of sample points of the signal level of the first video signal;
    interpolation calculating the signal level of the second video signal to be converted and output for the signal level between each of the plurality of sample points of the first video signal; and
    forming a conversion table including a set value of the second video signal for each sample point of the first video signal and an interpolation calculated second video signal between each of the plurality of sample points; and
    converting the corresponding second video signal based on the conversion table for the input first video signal, and outputting the second video signal.

12. A non-transitory recording medium including a video signal processing program for causing a computer to execute a video signal processing method for converting an input first video signal to a second video signal, and inputting to a display panel, the method comprising:
    receiving an input of a set value of a signal level of a second video signal to be converted and output in correspondence to a signal level of the first video signal for each of a plurality of sample points of the signal level of the first video signal;
    interpolation calculating the signal level of the second video signal to be converted and output for the signal level between each of the plurality of sample points of the first video signal;
    forming a conversion table including a set value of the second video signal for each sample point of the first video signal and an interpolation calculated second video signal between each of the plurality of sample points; and
    converting the corresponding second video signal based on the conversion table for the input first video signal, and outputting the second video signal.

* * * * *